(12) United States Patent
Ogawa

(10) Patent No.: US 6,708,043 B1
(45) Date of Patent: Mar. 16, 2004

(54) WATERPROOF HOUSING FOR A RADIO COMMUNICATION APPARATUS

(75) Inventor: Yutaka Ogawa, Kanagawa-ken (JP)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/743,658

(22) PCT Filed: May 11, 2000

(86) PCT No.: PCT/EP00/04404

§ 371 (c)(1),
(2), (4) Date: Jan. 12, 2001

(87) PCT Pub. No.: WO00/70777

PCT Pub. Date: Nov. 23, 2000

(30) Foreign Application Priority Data

May 14, 1999 (JP) .......................................... 11-170081

(51) Int. Cl.⁷ .............................................. H04M 1/00
(52) U.S. Cl. ......................... 455/550; 455/90; 455/575; 455/345
(58) Field of Search ........................ 455/90, 575, 550, 455/344, 348, 345, 350, 346, 351, 349; 379/433, 437; 361/814, 815, 816, 752, 679, 737; 441/12, 32, 1; D14/156, 162–164, 168, 170, 172, 140, 240, 256

(56) References Cited

U.S. PATENT DOCUMENTS

| | | | | |
|---|---|---|---|---|
| 4,856,087 A | * | 8/1989 | Nesbit ........................ 455/344 |
| 5,253,822 A | * | 10/1993 | Matsuki et al. ............. 242/344 |
| 5,367,296 A | * | 11/1994 | Schell ......................... 340/984 |
| 5,369,796 A | * | 11/1994 | Kung .......................... 455/344 |
| 5,386,084 A | * | 1/1995 | Risko ........................ 174/52.3 |
| 5,447,041 A | * | 9/1995 | Piechota .................... 62/457.7 |
| 5,613,237 A | * | 3/1997 | Bent et al. .................. 455/351 |
| 5,754,643 A | * | 5/1998 | Decker et al. .......... 379/413.02 |
| 5,946,395 A | * | 8/1999 | Petrella et al. ......... 379/433.01 |
| 6,058,356 A | * | 5/2000 | Swanson et al. .............. 702/99 |
| 6,078,792 A | * | 6/2000 | Phillips .................... 455/575.1 |
| 6,179,253 B1 | * | 1/2001 | Cotton ....................... 248/27.1 |
| 6,496,688 B2 | * | 12/2002 | Smith ....................... 455/343.6 |
| 6,510,226 B1 | * | 1/2003 | Thomann et al. ...... 379/413.04 |
| 2002/0096607 A1 | * | 7/2002 | Strunk ......................... 248/111 |
| 2002/0193136 A1 | * | 12/2002 | Halkosaari et al. ......... 455/550 |

FOREIGN PATENT DOCUMENTS

| WO | WO 9634331 A1 | * | 10/1996 | ............. G06F/3/00 |
|---|---|---|---|---|
| WO | WO 9703511 A2 | * | 1/1997 | ............ H04M/1/02 |

* cited by examiner

Primary Examiner—Pablo N. Tran

(57) ABSTRACT

A radio communication apparatus of the waterproof type includes an apparatus body and a waterproof cover member mounted on the body, in which when the apparatus body and the cover member are made integral, a secure waterproof condition can be attained without the need for any skill. The apparatus body (2) is formed, in an outer peripheral surface (6) to be covered by the cover member (3), with continuous grooves (7) and (8) or continuous steps. Packing elements (4) and (5) are fitted in the continuous grooves (7) and (8) or the continuous steps. The packing elements are arranged, when the apparatus body and the cover member are made integral, to project from the outer peripheral surface (6) of the apparatus body (2) in a direction perpendicular to an axis (16) of the body to thereby abut an inner surface (18) of the cover member (3).

1 Claim, 6 Drawing Sheets

WATERPROOF HOUSING FOR A RADIO COMMUNICATION APPARATUS

BACKGROUND OF THE INVENTION

1. Field of the Invention

The present invention relates, generally, to a radio communication apparatus of the waterproof type which is for marine use and/or for use in rainy weather, and more particularly, to an improvement for ensuring the waterproof feature of a body of such an apparatus.

2. Description of the Related Art

Conventionally, as shown in FIG. 6, in a radio communication apparatus 1b having such a structure that a tubular waterproof cover member 3b is slid over an apparatus body 2b to be mounted thereon to cover an outer peripheral surface 6b of the body for the waterproofing, an annular packing member 4b has been arranged to be attached to a rear surface 9b of the apparatus body 2b.

In the radio communication apparatus 1b, in order to unite the cover member 3b and the apparatus body 2b by sliding the member 3b (in the direction indicated by an arrow Ab) over the body 2b to be fitted thereon and to maintain the united state, a plurality of screws (not shown) are inserted, in the direction of the sliding, in holes (not shown) formed in the rear portion of the cover member 3b and then threaded into the female screws (not shown) formed in the rear surface portion 9b of the apparatus body 2b, again in the sliding direction.

In the above case, the direction of threadedly tightening by the plurality of screws is the same as the direction of waterproof effect by the packing 4b, and when pressing forces exerted by the threadedly tightened screws upon the packing 4b are even, deformation of the packing 4b by these pressing forces is annularly uniform, whereby a watertight condition between the apparatus 2b and the cover member 3b is ensured.

However, when the tightening forces of the plurality of screws are not even, the deformation of the packing 4b due to the pressing forces by the screws is also uneven. This makes the packing effect uneven, causing a problem that a gap develops between the apparatus body 2b and the cover member 3b, whereby the watertight condition is lost.

Particularly, the radio communication apparatus 1b of the waterproof type is often used in hazardous environments, such as on the sea and in rainy weather. Therefore, when the waterproof condition is not sufficient, serious problems may result.

To solve this problem, it is conceivable that the screws may be tightened uniformly so that the pressing forces against the packing are even. However, this give rise to another problem, i.e., skills in tightening the screws uniformly will be needed.

SUMMARY OF THE INVENTION

In view of the above, it is an object of the present invention to provide a radio communication apparatus which is easy to handle in respect of its waterproofness, and in which waterproof of the apparatus body can surely be attained.

The present invention is directed to a radio communication apparatus in which packing members, when mounted on the apparatus body, are interposed between the apparatus body and the cover member so as to project from an outer peripheral surface of the body in a direction perpendicular to an axis of the body to abut an inner surface of the cover member.

Specifically, the delivered object is achieved with the radio communication apparatus according to the invention, which comprises an apparatus body, a cover member for being slid over the apparatus body and mounted thereon to thereby cover an outer peripheral surface of the apparatus body, and a packing element interposed between the apparatus body and the cover member for preventing water from entering the apparatus body, characterized in that the apparatus body is formed, in its outer peripheral surface on which the cover member is mounted, with a continuous groove or a continuous step in which the packing element is fitted, the packing element being so arranged, when fitted in the continuous groove or the continuous step, to project from the outer peripheral surface of the apparatus body in a direction perpendicular to an axis of the apparatus body to thereby abut an inner surface of the cover member.

With the radio communication apparatus having such a structure, the packing members abut the waterproof cover member at their outer sides in a direction perpendicular to the axis of the outer peripheral surface of the apparatus body, so that pressing force at the abutting portion is uniform and is not susceptible to the threading of the screws.

The above-mentioned and other aspects of the invention are apparent form and will be elucidated, by way of non-limitative example, with reference to the embodiments described hereinafter. It should be noted that these embodiments are not intended to restrict the scope of the present invention.

DESCRIPTION OF THE PREFERRED EMBODIMENTS

Figure 1:
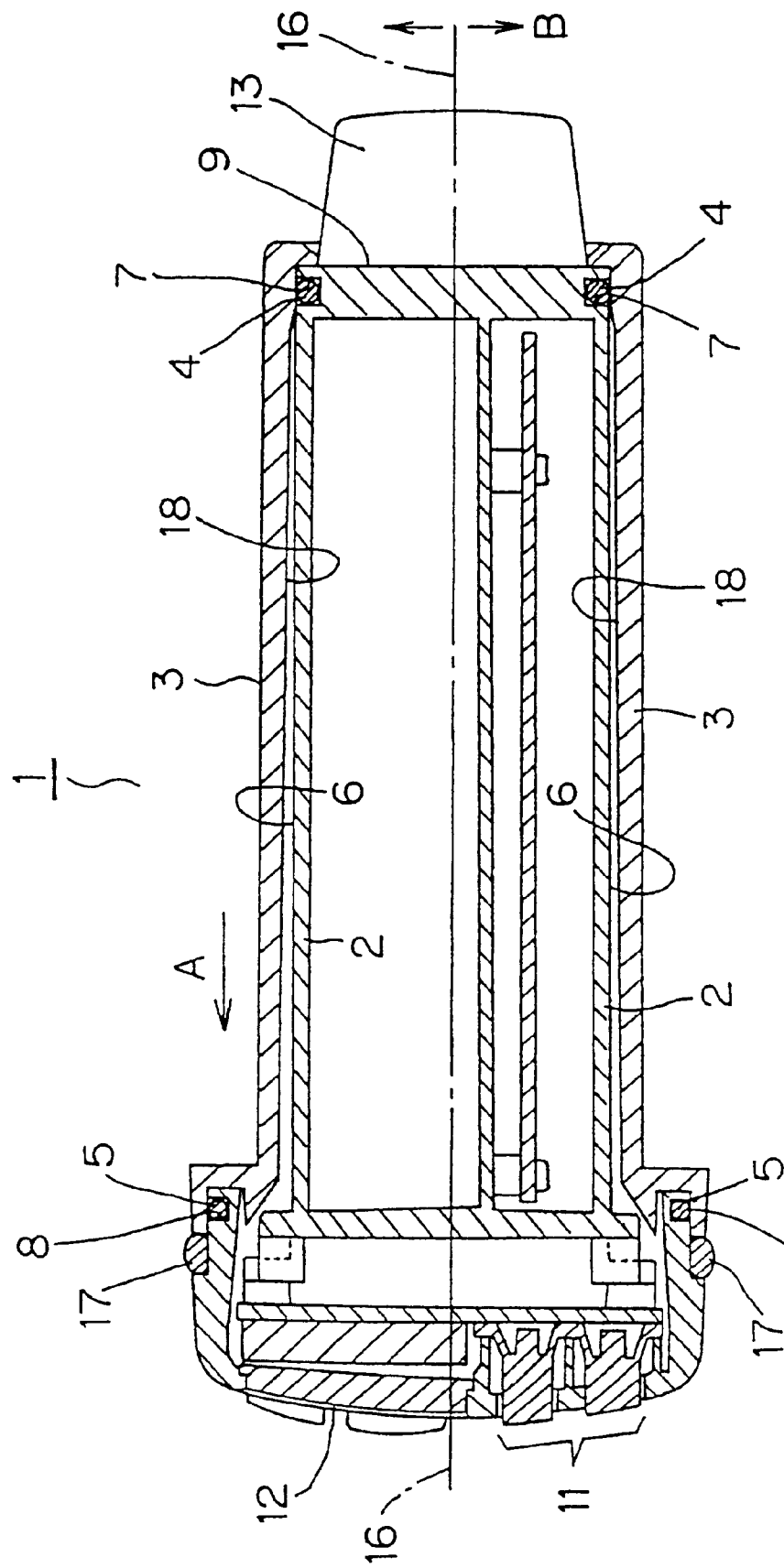
FIG. 1 is a cross-sectional view of a first embodiment of the invention taken along line I—I of FIG. 4.
Figure 2:
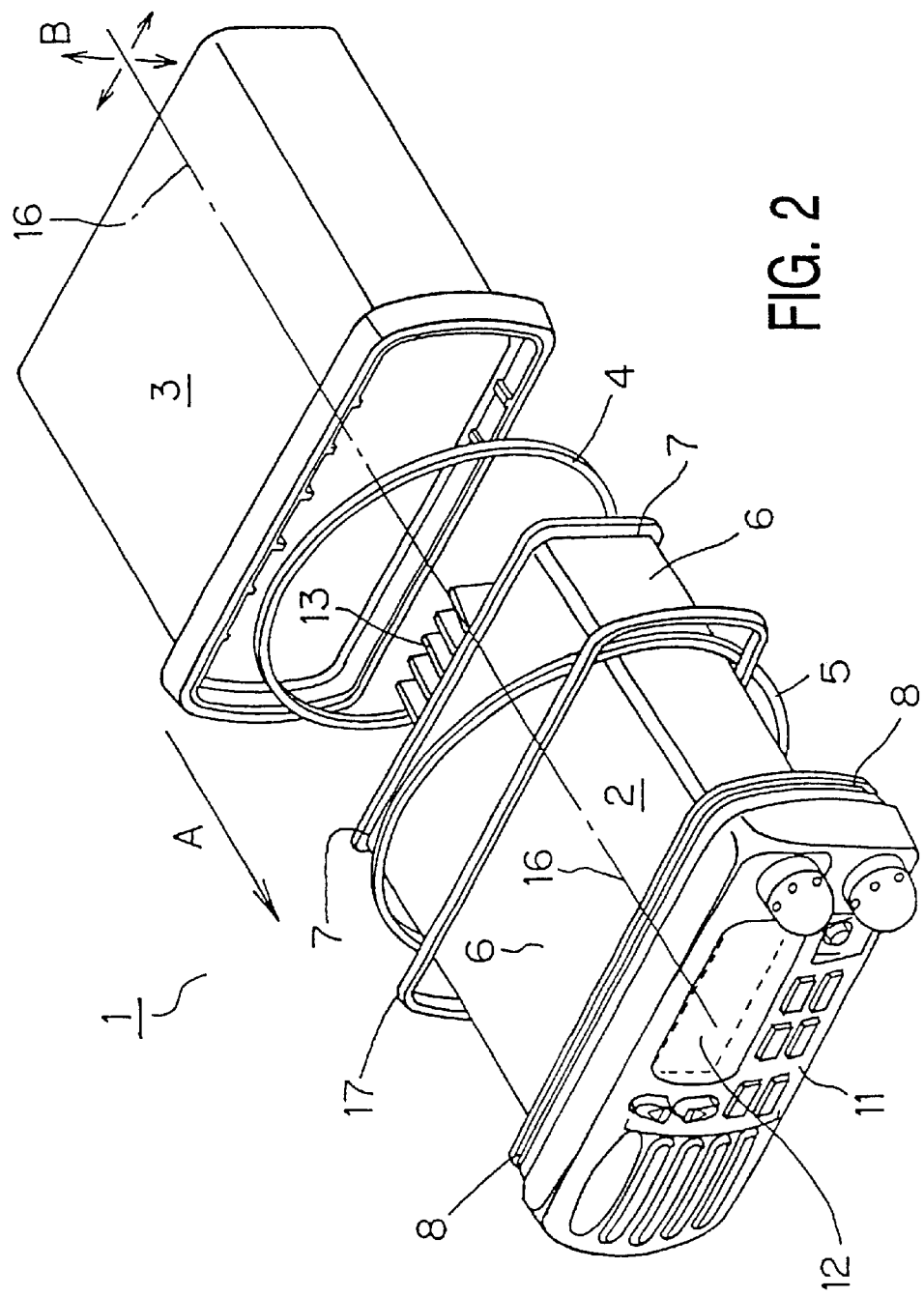
FIG. 2 is an exploded perspective view of the embodiment of FIG. 1 viewed from the front.
Figure 3:
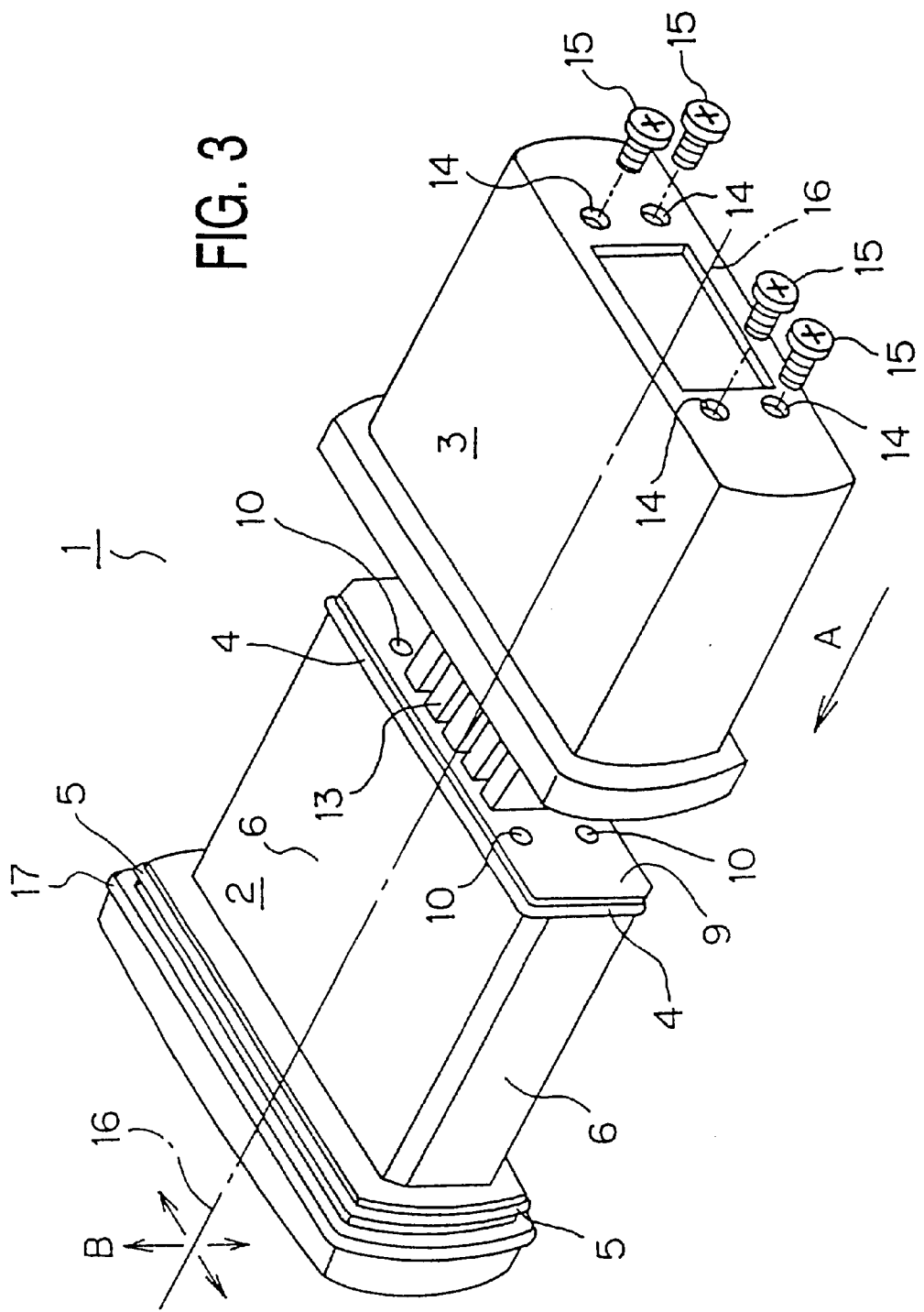
FIG. 3 is an exploded perspective view of the embodiment of FIG. 1 viewed from the rear wherein the packing elements have been mounted.
Figure 4:
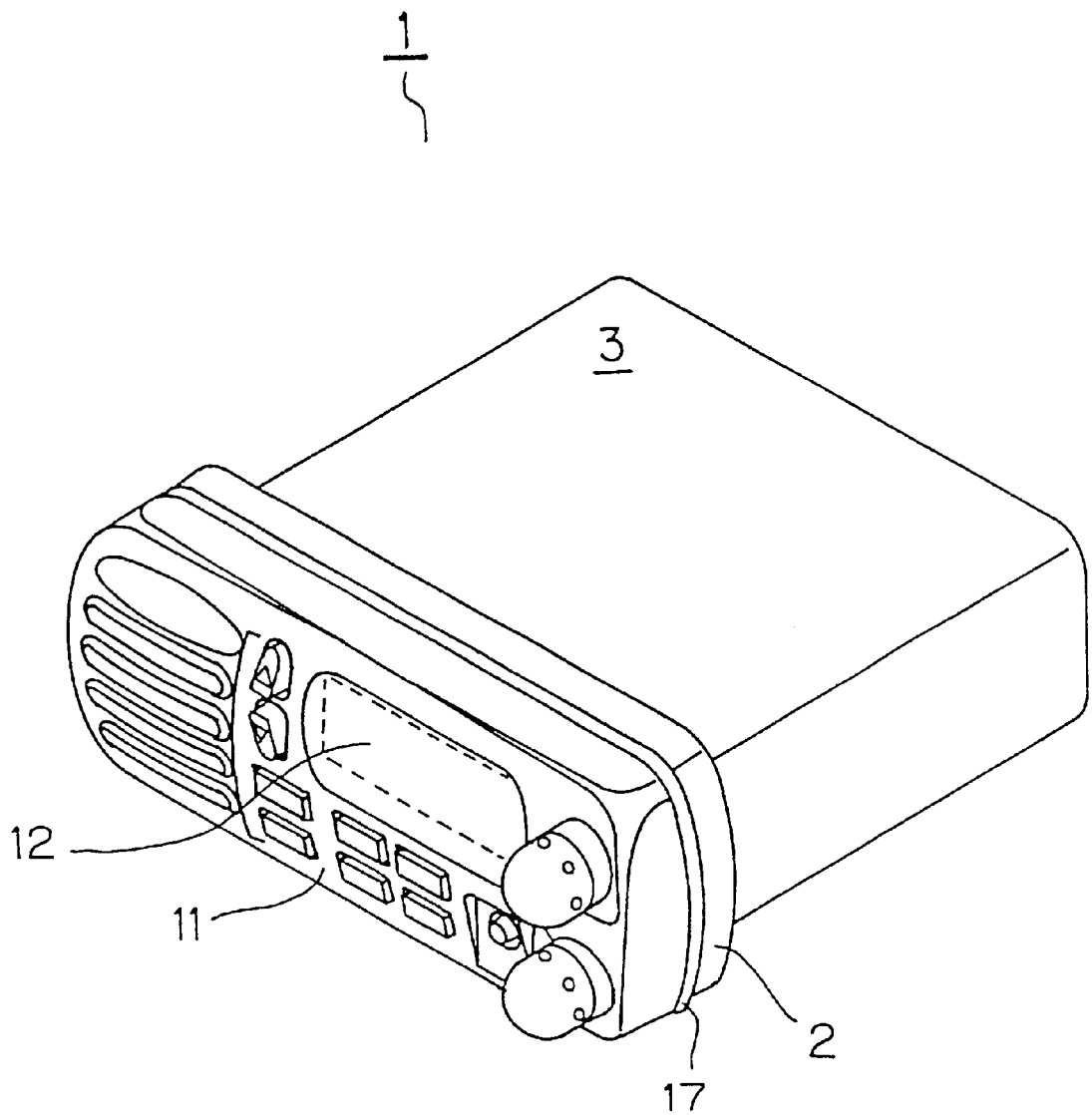
FIG. 4 is a perspective general view of the embodiment of FIG. 1 viewed from the front.

As shown in FIGS. 1 to 4, a radio communication apparatus 1 comprises an apparatus body 2, a cover member 3 for waterproofing, and packing members 4 and 5.

The apparatus body 2 comprises transmission and reception means (not shown) for effecting radio communication.

The apparatus body 2 is formed with two continuous annular grooves 7 and 8 in its outer peripheral surface 6 and with four female threaded screw-holes 10 in its rear portion 9.

The apparatus body 2 is further provided with an operation portion 11 and a display portion 12 at its front, and with a radiator fin unit 13 on its rear surface portion 9.

The cover member 3 is tubular and serves as a member which is slid over the apparatus body 2 and mounted thereon to cover the outer peripheral surface 6 of the apparatus body 2 for waterproofing.

The cover member 3 is formed with through-holes 14 at those portions thereof which oppose the female threaded screw-holes 10 of the apparatus body 2 when the cover member is united with the apparatus body 2.

Screws 15 are inserted in the through-holes 14 and threaded in the female threaded screw-holes 10 of the apparatus body 2 to unite the apparatus body 2 and the cover member 3 together and to keep them in the united state.

The packing members 4 and 5 are interposed between the apparatus body 2 and the cover member 3 and serve to prevent water from entering the apparatus body 2.

The packing members 4 and 5 are both annular and take fixed positions with respect to the apparatus body 2 when fitted, respectively, in the continuous grooves 7 and 8 of the apparatus body 2.

Thus, the packing members 4 and 5 are adapted to project from the outer peripheral surface 6 of the apparatus body 2 in a direction perpendicular to an axis 16 of the body 2 to abut an inner surface of the cover member 3 when fitted, respectively, in the continuous annular grooves 7 and 8 of the apparatus body 2.

A rubber ring 17 is interposed between engaging portions of the apparatus body 2 and the cover member 3.

The radio communication apparatus 1 is arranged as described above. Hereinafter, a description will be made of the assembling and use of the radio communication apparatus 1.

Firstly, the operation portion 11 and the display portion 12 are mounted integrally on a die-cast base of the apparatus body 2 at its front and a radiating fin unit 13 is attached to the body 2 at the rear portion 9.

Then, the packing members 4 and 5 are fitted, respectively, in the continuous grooves 7 and 8 formed in the apparatus body 2. In this case, outer peripheral edges of the packing members 4 and 5 project from the outer peripheral surface 6 of the apparatus body 2 in the direction perpendicular to the axis 16 of the body 2.

Subsequently, the cover member 3 is slid over the apparatus body 2 (in the direction indicated by the arrow A) so as to cover, in a coaxially surrounding manner, the outer peripheral surface 6 of the apparatus body 2 and then mounted on the apparatus body 2.

At this point, the screws 15 are inserted in the through-holes 14 and further threaded into the female threaded screw-holes 10 of the apparatus body 2, whereby the apparatus body 2 and the cover member 3 are united and kept in the united state.

In this situation where the apparatus body 2 and the cover member 3 have been united, the packing members 4 and 5 project from the outer peripheral surface 6 of the apparatus body 2 in the direction perpendicular to the axis 16 (in the direction indicated by the arrow B) between the apparatus body 2 and the cover member 3 and thus abut that surface of the cover member 3 opposing the outer peripheral surface 6 of the apparatus body 2, i.e., an inner surface 18 of the cover member 3.

Because of the packing members 4 and 5 being continuous and annular, those portions of the packing members 4 and 5 which project perpendicularly to the axis 16 and abut the inner surface 18 of the cover member 3 are also continuous and annular, so that a waterproof condition is obtained at the portion of the outer peripheral surface 6 of the apparatus body 2 between the two packing members 4 and 5.

Since the packing members 4 and 5 abut the waterproof cover member 3 at their outer sides with respect to the axis 16 of the outer peripheral surface 6 of the apparatus body 2, the pressing force exerted at all positions where the packing members 4 and 5 abut the inner surface 18 of the cover member 3 is uniform and does not differ in dependence on the extent to which the respective crews 5 are tightened.

Thus, in the radio communication apparatus 1, the waterproof condition of the outer peripheral surface 6 of the apparatus body 2 is obtained by the fact that the packing members 4 and 5 abut the inner surface 18 of the cover member 3 when the apparatus body 2 and the cover member 3 are made integral, and this waterproof condition of the apparatus body 2 will not be deteriorated even when the screws 15 are threaded into the female screw-holes 10 to keep the integral state. Waterproofing of the outer peripheral surface 6 of the apparatus body 2 is ensured in this manner.

Also, there will arise no such problem that skills in tightening the screws 15 are needed to obtain the above-described waterproof condition.

Hereinafter, a second embodiment of the invention will be described with reference to FIG. 5.

Figure 5:
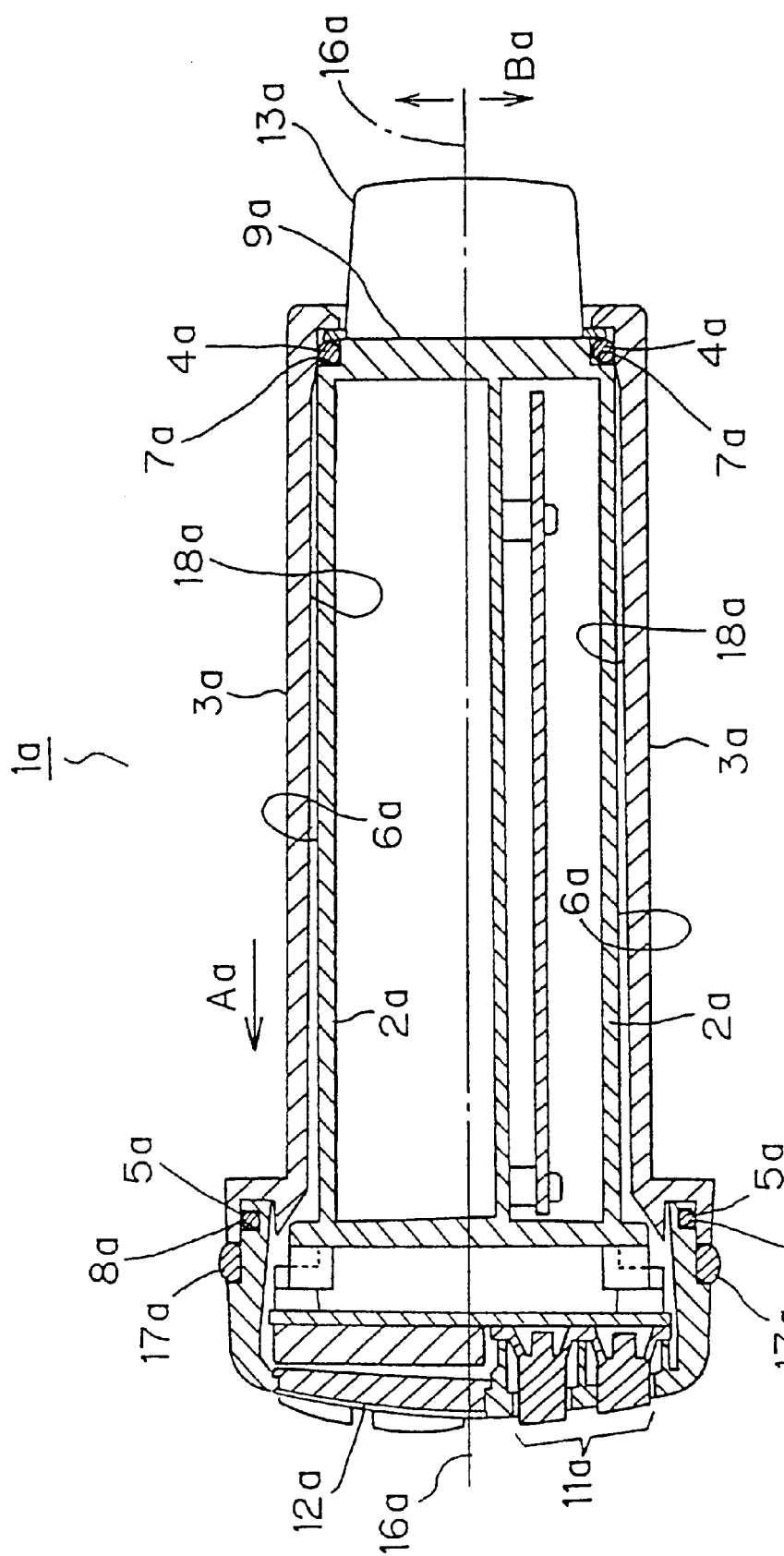
FIG. 5 is an illustration showing a second embodiment of the invention in a manner corresponding to FIG. 1.
Figure 6:
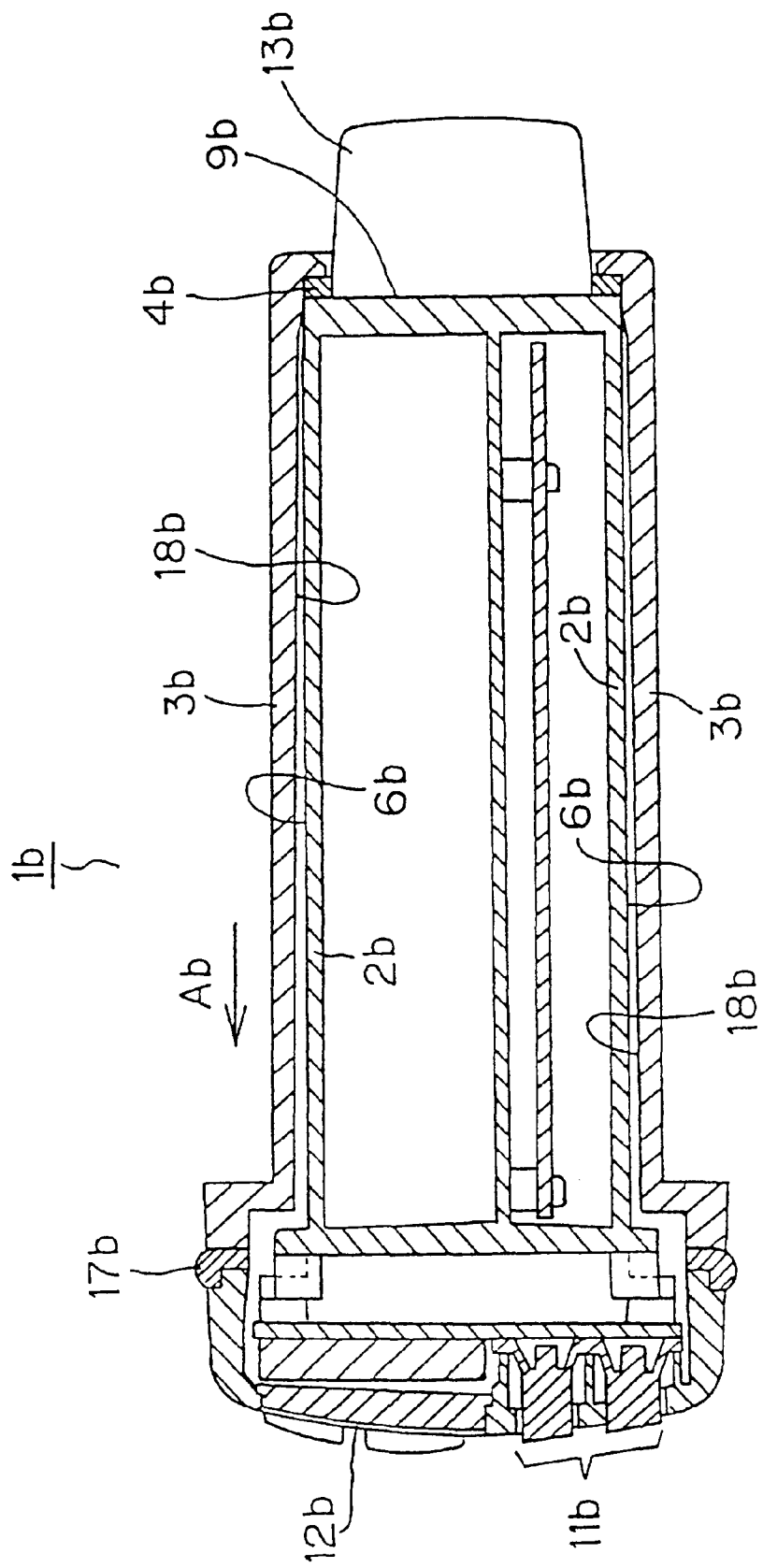
FIG. 6 is an illustration showing a prior art in a manner corresponding to FIG. 1.

FIG. 5 corresponds to FIG. 1 for the description of the first embodiment. A radio communication apparatus 1a is provided, similarly to the radio communication apparatus 1, with an apparatus body 2a, a cover member 3a for the waterproofing and packing members 4a and 5a.

The apparatus body 2a is formed at its outer peripheral surface 6a with a continuous annular step 7a and a continuous annular groove 8a, and at its rear portion 9a with four female threaded screw-holes (not shown). These four female threaded screw-holes have an identical structure to the female threaded screw-holes 10 in the first embodiment.

The apparatus body 2a is provided, at its front, with a control portion 11a and a display portion 12a and, at its rear portion 9a, with radiator fins 13a.

The cover member 3a is tubular and serves as a member which is slid over the apparatus body 2a and mounted thereon to coaxially cover the outer peripheral surface 6a of the apparatus body 2a for waterproofing.

The cover member 3a is formed with through-holes (not shown) at those portions thereof which oppose the female threaded screw-holes of the apparatus body 2a when the cover member 3a is united with the apparatus body 2a. These through-holes have the same structure as the through-holes 14 in the first embodiment.

It is so arranged that, when the apparatus body 2a and the cover member 3a are to be united, screws (not shown) are inserted in the through-holes of the cover member 13a and threaded in the female threaded screw-holes of the apparatus body 2a to keep the united condition of the apparatus body 2a and the cover member 3a.

The packing members 4a and 5a are both annular and are arranged to be fitted in the continuous step 7a and the continuous groove 8a to take fixed positions with respect to the apparatus body 2a.

With such an arrangement, the packing members 4a and 5a are interposed between the apparatus body 2a and the cover member 3a and serve to prevent water from entering the apparatus body 2a. Thus, when fitted in the annular continuous grooves 7a, 8a of the apparatus body 2a, the packing members 4a and 5a are adapted to project from the outer peripheral surface 6a of the apparatus body 2a in a direction perpendicular to an axis 16 of the body 2 (in the direction indicated by an arrow Ba) to abut an inner surface 18a of the cover member 3a.

The packing member 4a is formed to have a cross-section of a combination of square and circular shapes so that the waterproofing of the apparatus body 2a is performed twofold by both of the square cross-section portion and the circular cross-section portion of this packing member. A rubber ring 17a is interposed between engaging portions of the apparatus body 2a and the cover member 3a.

The radio communication apparatus 1a is arranged as described above. The packing members 4a and 5a project from the outer peripheral surface 6a of the apparatus body 2a in a continuous manner in the direction perpendicular to the axis 16a (in the direction indicated by the arrow Ba) between the apparatus body 2a and the cover member 3a and thus abut the inner surface 18a of the cover member 3a.

In this situation, because of the packing members 4a and 5a being continuous and annular, those portions of the packing members 4a and 5a which project perpendicularly to the axis 16a and abut the inner surface 18a of the cover member 3a are also continuous and annular, so that a waterproof condition is obtained at the portion of the outer peripheral surface 6a of the apparatus body 2a between the two packing members 4a and 5a.

Since the packing members 4a and 5a perpendicularly abut the waterproof cover member 3a at their outer sides with respect to the axis 16a of the outer peripheral surface 6a of the apparatus body 2a, the pressing force exerted at any positions where the packing members 4a and 5a abut the inner surface 18a of the cover member 3a is uniform and does not differ in dependence on the extent to which the respective screws are tightened for keeping the apparatus body 2a and the cover member 3a united.

Thus, in the radio communication apparatus 1a, the waterproof condition of the outer peripheral surface 6a of the apparatus body 2a is obtained by the fact that the packing members 4a and 5a abut the inner surface 18a of the cover member 3a when the apparatus body 2a and the cover member 3a are united in the same manner as in the radio communication apparatus 1, and this waterproof condition of the apparatus body 2a will not be deteriorated even when the screws are threaded to unite the apparatus body 2a and the cover member 3a together to keep such state. Waterproofing of the outer peripheral surface 6a of the apparatus body 2a is ensured in this manner.

Also, there will arise no such problem that skills in tightening the screws for keeping the apparatus body 2a and the cover member 3a integral are needed to obtain the above-described waterproof condition.

Although the packing members 4 and 5 for the radio communication apparatus 1 and the packing members 4a and 5a for the radio communication apparatus 1a have a circular shape, any suitable shape such as a square shape and an elliptical shape may alternatively be selected therefor in correspondence with the shape of the continuous grooves 7, 8 and 8a and the continuous step 7a.

Rubber and synthetic resin may be taken as examples of the material for the packing members 4 and 5 for the radio communication apparatus 1 and the packing members 4a and 5a for the radio communication apparatus 1a. It will be preferable that requirements for the material, such as, the degree of curing of rubber and the kind of synthetic resin, be chosen based on the durability, corrosion resistivity and environment.

With the radio communication apparatus according to the invention, by the provision of the annular packing members which project from the outer peripheral surface of the apparatus body in a direction perpendicular to the axis of the body and abut the inner surface of the cover member when the apparatus body and the waterproof cover member are made integral, a secure waterproof condition can be attained without being affected by the degree of tightening the screws for keeping the apparatus body and the cover member integral and without the need for skills in handling the apparatus when the apparatus body and the waterproof cover member are made integral.

What is claimed is:

1. A radio communication apparatus comprising:
   an apparatus body;
   a cover member for being slid over said apparatus body and mounted thereon to thereby cover an outer peripheral surface of said apparatus body; and
   a packing element interposed between said apparatus body and said cover member for preventing water from entering an enclosed area between said cover member and said apparatus body, characterized in that said apparatus body is formed with a continuous groove or a continuous step in said outer peripheral surface on which said cover member is mounted, said continuous groove or said continuous step being formed to fit said packing element such that said packing element projects from said outer peripheral surface of said apparatus body in a direction perpendicular to an engaging direction of said cover member on said apparatus body, whereby said packing element, when fitted in said continuous groove or said continuous step, abuts an inner surface of said cover member.

* * * * *